Feb. 5, 1952  J. D. BENFIELD  2,584,537
PIPE AND TUBING BENDER
Filed Nov. 25, 1946  2 SHEETS—SHEET 1
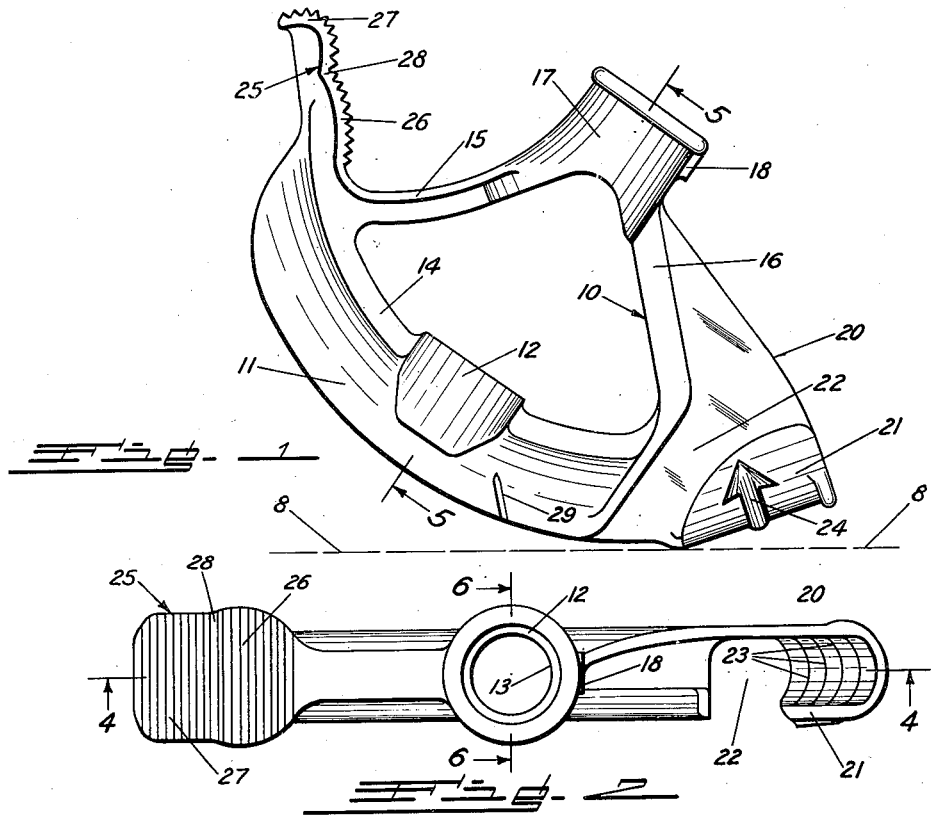
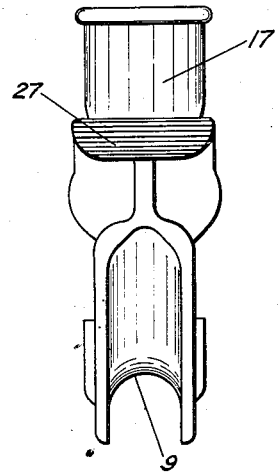
INVENTOR.
John D. Benfield
BY
Harry P. Jennings
ATTORNEY

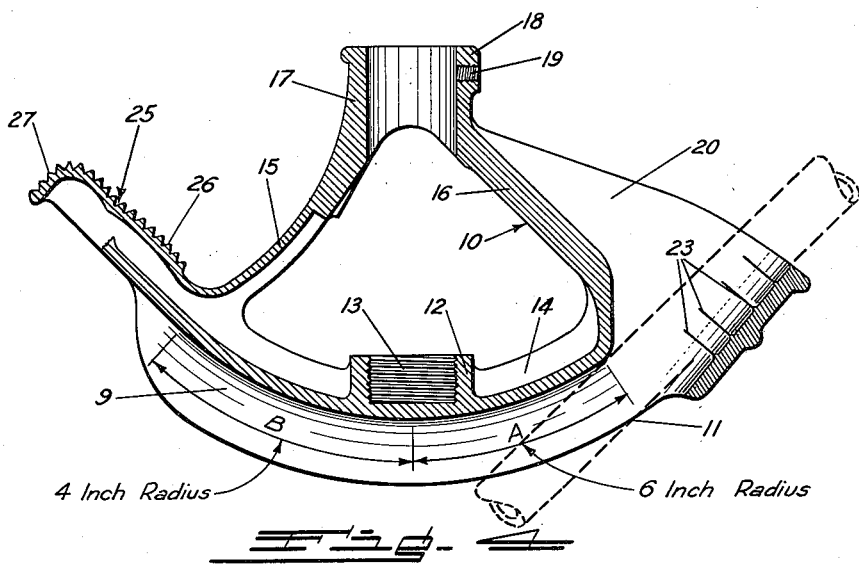
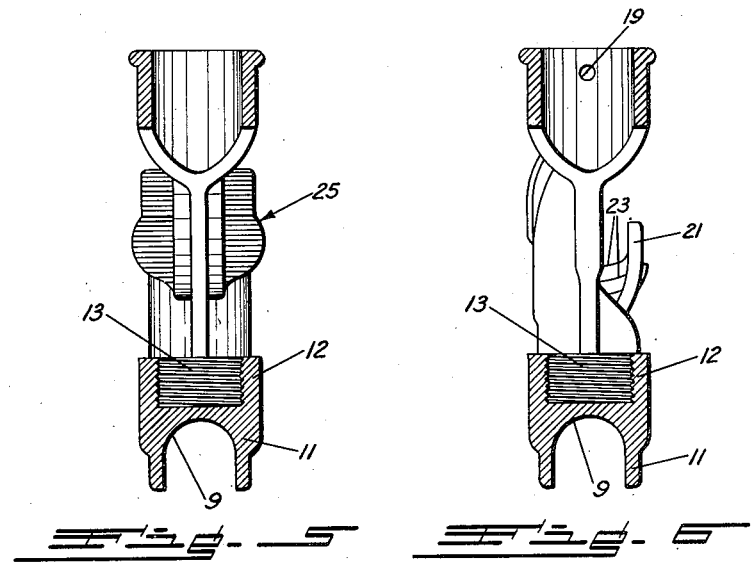

Patented Feb. 5, 1952

2,584,537

UNITED STATES PATENT OFFICE 2,584,537

PIPE AND TUBING BENDER

John D. Benfield, Detroit, Mich.

Application November 25, 1946, Serial No. 712,205

3 Claims. (Cl. 81—15)

The present invention relates to a pipe and tubing bender. It has to do particularly with an improved portable tool or device for bending either pipe, raceway, conduit or light gauge tubing "on location"; i. e., at the point or place of installation of the pipe, raceway, tubing or conduit.

One of the objects of the present invention is to provide an improved bender capable of producing, with relative ease, facility and accuracy, a true-radius bend in a piece of pipe, raceway, rod, conduit or tubing.

Another object of the present invention is to provide an improved bender of the foregoing character in which the elongated groove for receiving the pipe or tubing to be bent is formed on an arc of double radius; i. e., eccentric. The ¾" pipe size bender for example is formed on an arc of bending groove curved on an arc of six inch inside radius for approximately 40° of arc which "fades" or merges into an arc curved on a four inch inside radius for the remaining 60° of the 100° arc. In portable hand tools which contain no mandrel or follow bar a bending arcuate groove of single radius does not produce a true radius in the object being bent, since the initial resistance of the pipe, tubing, conduit, or raceway is so great at the start of the bending operation that the pipe, tubing, raceway or conduit actually rides up and away from the bottom of the bending groove for a distance of approximately 40° of a 100° arc. This "humping up" results in an untrue bend and through many experiments it was discovered that if a larger more gradual radius was provided for the first 40° of the arc the "humping up" would still take place but by so doing the object would actually "hump" itself into a true radius for the entire 100° arc. Furthermore, the existance of the more gradual arc over the area of greater bending resistance makes it far easier for the operator because it requires less effort. In other words, the larger the arc the easier it is to bend the object for the first 40° are the hardest. Beyond that point, there exists between the tool and the object plenty of contact surface supporting the side walls and the leverage is such that there is no longer any appreciable bending resistance.

Another object of the present invention is to provide a bending tool with a 100° arc which permits operator to go beyond the point desired thereby allowing for "spring back" to the popular 90° arc. Obviously this precludes the necessity of the operator taking another "bite" on pipe, raceway, tubing, or conduit. A further object of the present invention is to provide an improved bender having a hook in which "back-play" has been incorporated, and which is so formed as to permit the pipe or tubing being bent to "give" or "bow" gradually and gently to seat itself into all the teeth of the hook as the bending pressure is applied. This feature eliminates distortion or kinking or reduction in outside diameter of the pipe, raceway, rod, tubing or conduit at the very start of the bend.

A further object of the present invention is to provide an improved pipe or tubing bender of the foregoing nature having an improved foot treadle of eccentric contour which, when initial foot pressure is applied thereto, will transmit or direct said initial pressure to the starting portion or mouth of the eccentric groove, at which point the bending resistance is greatest and consequently the application of pressure is most needed; it being a further object of the present invention to provide an improved treadle as aforesaid which is formed on a rearwardly and downwardly extending plural arc so shaped and constructed as to cause the operator's foot pressure to be always in a horizontal plane, whereby said pressure is therefore transmitted to that part of the pipe or tubing which is actually undergoing the bending operation.

The foregoing and other objects and advantages of the present invention will appear from the following description and appended claims when considered in connection with the accompanying drawings forming a part of this specification, wherein like reference characters designate corresponding parts in the several views.

In said drawings:

Fig. 1 is a side elevational view of a preferred form of pipe and tubing bender embodying the present invention, showing the bender poised on the floor, or other supporting surface, and in its starting position.

Fig. 2 is a top plan view of the bender when in upright position.

Fig. 3 is an end elevational view of the bender of the preceeding figures, looking toward the foot treadle-end and with the bender in upright position.

Fig. 4 is a longitudinal sectional view taken substantially along the line 4—4 of Fig. 2, looking in the direction of the arrows.

Fig. 5 is a transverse sectional view taken substantially along the line 5—5 of Fig. 1, looking in the direction of the arrows; and Fig. 6 is a transverse sectional view taken substantially along the line 6—6 of Fig. 2, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to the drawings there is shown therein one form of improved portable pipe and tubing bender embodying the present invention. The bender, as shown, is preferably formed from metal and may, as shown, take the form of a one-piece casting, although if desired, it may be produced by other methods.

As shown in Fig. 1, the bender is poised on the floor or other surface 8 in its starting position and comprises a body portion, shown as a whole at 10, having a rocker or curved footlike or base portion 11 whose inner and contral portion is shaped or formed to provide a socket 12 which may be interiorly threaded at 13, as seen in Figs. 2, 4, 5, and 6. The rocker-like base portion 11 is of inverted substantially U-shaped cross section and has an inner and preferably centrally disposed longitudinal reinforcing rib 14, see particularly Figs. 1 and 4.

Extending upwardly and in converging relationship from the base or rocker portion 11, are a pair of arms or upright members or portions 15 and 16 which terminate at their upper end portions in a preferably tubular guide or handle-supporting sleeve 17. This sleeve, as shown, see particularly Figs. 4 and 6, is provided with a boss 18 threaded at 19 to receive a set screw (not shown) the purpose of the set screw being to prevent rotation and accidental displacement or loosening of an operating handle (not shown) which extends through the guide sleeve or tubular portion 17 and has its end preferably engaged with the threaded base socket 12. The arms 15 and 16, together with the rib portion 14 of the base, define or frame a relatively large opening in the body portion of the tool, as clearly seen in Figs. 1 and 4.

It will be noted that the upwardly extending arm or portion 16 has a wide and preferably flat end wall or extension 20 which merges with the rocker-like base 11 at one side of the longitudinal groove 9 formed therein. This portion 20 extends outwardly and downwardly and is reversely curved at 21 to provide an entrance throat 22 for the longitudinal groove 9. The inner surface of the guide and pipe or tube-supporting portion 21, known to the trade as the "hook" of the bender, is preferably provided with a series of transverse teeth or upwardly projecting ribs 23. As clearly seen in Fig. 1 of the drawings the hook 21 is provided on its outer surface with an arrow or indicator 24 which, when the bender is in use, serves as a base for accurately gauging bends in the pipe, tubing, or conduit to be bent by the device. Notch 29 serves as an index which gauges the length of the pipe and positions the bend. One or both sides of the base 11 may be provided with a notch 29.

The end of the rocker-like base or foot portion 11 of the device which is at the opposite side of the hook or so-called mouth portion of the longitudinal groove 9, is extended outwardly beyond the arm 15 to provide a bending foot treadle having an eccentric contour and shown as a whole at 25. As best seen in Figs. 1 and 2, the foot treadle 25 comprises, as shown, portions 26 and 27 which merge at the point 28. It is to be noted that the curvature of the portion 26 of the treadle is less than the curvature of portion 27 thereof. Thus, in the starting position of the present tool or device, the foot of the operator will first engage the portion 27 for a purpose to be described below.

With particular reference to Fig. 4 of the drawings, it is to be noted that the longitudinal arcuate groove 9 is eccentric and has on the particular size illustrated (¾" tubing size) an arc of six (6) inch inside radius for a distance of approximately 40 degrees of arc, as indicated by the arrow identified as "A," which radius "fades" into or merges with, in this case, an arc curved on a four (4) inch inside radius for the remaining 60 degrees of the 100 degree of arc. This latter, or arc curved on a four (4) inch inside radius is indicated by the arrow identified by the letter "B." In other words, the arc of the inside radius of the groove 9 constituting the two merging portions indicated by the letters "A" and "B," is eccentric. This double radius is one of the outstanding and important features of the present invention.

As is well-known to every tradesman, it is easier to make a long radius bend in a pipe or tube than a short radius bend. They also know that the first one-third or from 33⅓° to 40° of the bend presents the greatest bending resistance and is therefore the hardest to produce. By virtue of the present invention, the remainder of the "sweep" in completing the bend is increasingly easy, because of the fact that the pipe or tubing is being supported over a relatively large surface area and the leverage is greater. Because of this, and even though the end result of the bending operation with the present invention is a true radius four (4) inches in this instance, it has required no more effort on the part of the mechanic or tradesman than if he were actually making a six (6) inch radius bend over the first and difficult 40° arc, which is represented by the letter "A" in Fig. 4.

While it may appear that an untrue radius would or could be produced because of the combination of the six (6) inch radius of the arc and the four (4) inch radius of the arc, actually the pipe or tubing is provided with an even truer radius than if the groove 9 had a four (4) inch inside radius of arc all of the way around for the full 100 degrees. This is due to the fact that when the pipe or tubing is under such terrific stress over the first or initial 33⅓ degrees of arc of bending, it has a marked tendency to jump out of the groove or "hump up" and ride up and away from the bottom of the arcuate groove 9. Even with foot pressure being applied to the treadle 25, the pipe or tubing tends to ride up and away from the bottom of the groove 9 which actually causes the present invention to produce a true radius of arc in this case a four (4) inch radius of arc. Therefore, the larger six (6) inch radius of arc, represented by the latter "B," compensates for this condition, the result being that the pipe or tubing rides up in the arcuate groove 9 just enough to compensate for the "humping up" which results from the conventional single true radius of arc.

I have discovered that in order to produce a true radius of arc, it is necessary to provide a bender like that of the present invention and which has the eccentric arcuate groove described above. Such eccentric arc provides the necessary allowance which must be made for the natural tendency of the pipe or tubing to ride up off, or move away from, the bottom of the arcuate groove for the first 33⅓° to 40° of the arc, during the bending operation.

The hook 21 is so shaped and proportioned to allow for "back-play." It is to be understood that when the pipe or tubing is placed or positioned in the arcuate groove 9 of the bending tool or device and poised for the bending operation, there will be a clearance of approximately 3/64 of an inch between said pipe or tubing and those teeth 23 of the hook which are adjacent the groove 9. This 3/64 inch clearance tapers down to a point where the outer teeth, remote from the groove 9, have full bearing on the pipe or tubing. By virtue of this structure, the pipe or tubing being bent is given a chance to "give" or "bow" gently and thus seat itself into all the teeth 23 as the bending pressure is applied. This has its advantages in that a gentle gradual contour of the bend in the pipe or tubing is obtained. Moreover, the common sharp binding, crimping, and pinching of the pipe, which tends to reduce the diameter, flake off the enamel coat of a coated piece of tubing or pipe, or which scars the galvanized surface, and which always occurs with presently known or existing bending tools, is completely eliminated.

Pipe and tubing benders have had a common fault in that the hook, yoke, or sleeve which clinches the tubing scars, binds, or pinches the tubing to a point where protective coatings are chewed or scraped off and the tubing is often distorted and squeezed out of shape at the start of the bending operation. In accordance with the present invention, the simple provision of what is termed "back-play" at the hook 21 is accomplished by casting or otherwise forming the hook at a deliberate angle so that when the pipe is poised for bending, it rests upon only the first two teeth of the hook, permitting the tubing to gently bow itself through the liberal wedge-shaped space shown in Fig. 4 of the drawings and eventually seats itself solidly against the full number of teeth formed in the hook. By the time the full seating of the tubing occurs, the bend has progressed so far as to completely eliminate pinching, scuffing, or distortion of the article being formed.

Another important feature of the present invention resides in the novel form and construction of the foot treadle 25 of the tool. As stated above, this treadle has an eccentric contour and is formed on a rearwardly and downwardly extending plural arc so that when in the starting position of the tool, the rounded portion 27 of the treadle will be located in such a position that foot pressure applied thereto always in a horizontal plane by the mechanic or operator, is thereby transmitted or directed to the starting portion of the groove 9, as represented by the letter "A," which portion is in the most critical need of pressure. However, as the bend is formed in the pipe or tubing, by virtue of the particular shape or formation of the treadle and the portions 26 and 27 thereof, the vertical foot pressure being applied thereto is conveniently applied without slippage of the worker's foot throughout the complete 100° sweep of the tool.

The foot treadle 25 is of liberal width and is so shaped that it is always in a comfortable position for the reception of the mechanic's foot during the entire movement of the bending tool between 0° and 100°. Foot pressure must be applied or the tubing will kink because it bends outside of the tool where there is no support for the side walls of the tubing. In Fig. 1 of the drawings, it will be noted that treadle portion 27 invites foot pressure, see also Fig. 3, and is in a substantially horizontal plane convenient to start the bending stroke. As the tool moves, the shape of the treadle permits the tool to roll under the mechanic's foot progressively, thereby keeping the pressure directed to the point where the tubing is actually being formed. It will be noted that this treadle is comprised of two eccentric curved portions 26 and 27 which meet at a depressed point 28. The reason for this is that it is customary for mechanics to take a short stroke, then shift their weight a bit for better body balance, and then complete the stroke. The second portion of the bending operation would find the mechanic's foot on treadle portion 26 of Fig. 1.

It is to be understood that in accordance with the present invention, benders as disclosed herein, or variations thereof, will be produced in a multiplicity of sizes for use in the bending of pipe or tubing such as ⅜ inch, ½ inch, ¾ inch, 1 inch, 1¼ inch and 1½ inch and 2 inch trade sizes which are known by their nominal inside diameters.

By virtue of the present improved bending tool, many of the objectionable features of and results obtained by, previously known hand or portable pipe benders which caused flattening, bulging, distorting, or kinking of the pipe, conduit, or tubing at the initial bend, have been completely eliminated and overcome.

It is to be understood that while there is shown in the drawings only a preferred form of the present invention and a given design or shape for one size only of the new and improved bending tool comprising said invention, other shapes or designs employing different radii combinations may be employed within the scope of the invention, so long as they incorporate or include the eccentric groove 9, the particular and novel formation and construction of hook 21, and the eccentric-contoured treadle 25, as disclosed herein.

Having thus described the invention, what is claimed is:

1. A pipe, raceway, rod, conduit and tubing bender, comprising a body portion, a curved base portion formed on the body portion, and a work-engaging hook portion, said curved base portion providing an arcuate groove having an arc of dual radius of curvature with each arc section being of substantially equal length, the arc section having the greater radius of curvature being located adjacent the work-engaging hook portion.

2. A bender according to claim 1, wherein the work-engaging hook portion is set at an angle to provide a clearance at its end adjacent the curved base portion so as to provide a space into which the pipe, raceway, rod, conduit, or tubing seats itself as bending pressure is applied, whereby to eliminate the bending, scuffing, pinching and chewing up of the zinc or other coating on the article being bent at the outset of the bend in the article.

3. A bender according to claim 1, wherein a foot treadle is disposed at the end of the body portion opposite the work-engaging hook portion and extends beyond the body portion and is formed on a rearwardly and downwardly extending plural arc, whereby to provide the user of the bender with additional leverage and a convenient step and permit him to apply vertical pressure on said treadle which is always in a horizontal plane.

JOHN D. BENFIELD.

REFERENCES CITED

The following references are of record in the file of this patent:

UNITED STATES PATENTS

| Number | Name | Date |
| --- | --- | --- |
| 871,052 | Wallace | Nov. 12, 1907 |
| 1,298,106 | Silvey | Mar. 25, 1919 |
| 1,659,026 | Henderson | Feb. 14, 1928 |
| 1,746,011 | Paratschek | Feb. 4, 1930 |
| 1,752,220 | Allen | Mar. 25, 1930 |
| 1,832,698 | Gale | Nov. 17, 1931 |
| 1,878,754 | Buchanan | Sept. 20, 1932 |
| 2,381,064 | Lewin | Aug. 7, 1945 |